(12) United States Patent
Dasgupta et al.

(10) Patent No.: US 11,810,187 B2
(45) Date of Patent: *Nov. 7, 2023

(54) HIERARCHICAL DEEP NEURAL NETWORK FORECASTING OF CASHFLOWS WITH LINEAR ALGEBRAIC CONSTRAINTS

(71) Applicant: Intuit Inc., Mountain View, CA (US)

(72) Inventors: Sambarta Dasgupta, Sunnyvale, CA (US); Sricharan Kallur Palli Kumar, Mountain View, CA (US); Shashank Shashikant Rao, San Jose, CA (US); Colin R. Dillard, Redwood City, CA (US)

(73) Assignee: Intuit Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/862,494

(22) Filed: Jul. 12, 2022

(65) Prior Publication Data

US 2022/0351002 A1 Nov. 3, 2022

Related U.S. Application Data

(63) Continuation of application No. 16/688,927, filed on Nov. 19, 2019, now Pat. No. 11,423,250.

(51) Int. Cl.
*G06Q 40/02* (2023.01)
*G06F 17/17* (2006.01)
(Continued)

(52) U.S. Cl.
CPC .............. *G06Q 40/02* (2013.01); *G06F 17/17* (2013.01); *G06F 18/217* (2023.01);
(Continued)

(58) Field of Classification Search
CPC .... G06K 9/6219; G06K 9/6262; G06F 17/17; G06N 3/082; G06N 3/084; G06Q 10/04; G06Q 40/02
See application file for complete search history.

(56) References Cited

U.S. PATENT DOCUMENTS 4,914,603 A 4/1990 Wood
7,660,705 B1 2/2010 Meek et al.
(Continued)

FOREIGN PATENT DOCUMENTS

WO 2018085859 A1 5/2018

OTHER PUBLICATIONS

Equality Constraints in Models, Williams, 2015; https://www3.nd.edu/~rwilliam/stats2/l42.pdf (Year: 2015).*
(Continued)

*Primary Examiner* — Jianxun Yang
(74) *Attorney, Agent, or Firm* — Paradice & Li LLP (57) ABSTRACT

Systems and methods for forecasting cashflows across one or more accounts of a user disclosed. One example method may include retrieving a data set for each of a plurality of accounts from a database, constructing a graph including a plurality of nodes linked together by a multitude of edges, wherein each node identifies a time series value corresponding to one of the accounts, and each edge indicates a time series value of a corresponding set of transactions occurring between a corresponding pair of accounts, determining a plurality of constraints, determining a specified loss function based on the plurality of constraints, back-propagating a derivative of the specified loss function into a deep neural network (DNN) to determine a set of neural network parameters, forecasting, using the DNN, a time sequence for one or more of the nodes and one or more of the edges, and providing the forecasted time sequences to the user.

16 Claims, 5 Drawing Sheets

(51) Int. Cl.
*G06N 3/082* (2023.01)
*G06N 3/084* (2023.01)
*G06F 18/231* (2023.01)
*G06F 18/21* (2023.01)

(52) U.S. Cl.
CPC ........... *G06F 18/231* (2023.01); *G06N 3/082* (2013.01); *G06N 3/084* (2013.01)

(56) References Cited

U.S. PATENT DOCUMENTS

| | | | |
|---|---|---|---|
| 10,364,662 | B1 | 7/2019 | Basu et al. |
| 11,281,969 | B1 | 3/2022 | Rangapuram et al. |
| 2005/0222929 | A1* | 10/2005 | Steier .............. G06Q 40/00 705/35 |
| 2008/0183648 | A1 | 7/2008 | Goldberg et al. |
| 2010/0332210 | A1 | 12/2010 | Birdwell et al. |
| 2014/0019448 | A1 | 1/2014 | Leonard et al. |
| 2014/0114897 | A1 | 4/2014 | Nakamura et al. |
| 2015/0253463 | A1 | 9/2015 | Narayanaswamy |
| 2015/0254569 | A1 | 9/2015 | Baughman et al. |
| 2018/0046926 | A1 | 2/2018 | Achin et al. |
| 2018/0060738 | A1 | 3/2018 | Achin et al. |
| 2018/0060744 | A1 | 3/2018 | Achin et al. |
| 2018/0137522 | A1 | 5/2018 | Modarresi et al. |
| 2018/0150609 | A1 | 5/2018 | Kim et al. |
| 2018/0219889 | A1 | 8/2018 | Oliner et al. |
| 2018/0276562 | A1 | 9/2018 | Woulfe et al. |
| 2018/0300737 | A1 | 10/2018 | Bledsoe et al. |
| 2018/0293462 | A1 | 11/2018 | Ambati et al. |
| 2019/0012684 | A1 | 1/2019 | Cui et al. |
| 2019/0122138 | A1 | 4/2019 | Li et al. |
| 2019/0122307 | A1 | 4/2019 | Sayed |
| 2019/0130256 | A1* | 5/2019 | Ghahramani .......... G06N 3/047 |
| 2019/0228336 | A1 | 7/2019 | Kanagawa et al. |
| 2019/0258927 | A1 | 8/2019 | Chen et al. |
| 2020/0012886 | A1 | 1/2020 | Walters et al. |
| 2020/0090003 | A1 | 3/2020 | Marques et al. |
| 2020/0111109 | A1 | 4/2020 | Lei et al. |
| 2020/0175354 | A1 | 6/2020 | Volodarskiy et al. |
| 2020/0242483 | A1 | 6/2020 | Rao et al. |
| 2020/0285503 | A1 | 9/2020 | Dou et al. |
| 2020/0372431 | A1 | 11/2020 | Okimoto et al. |
| 2021/0150257 | A1 | 5/2021 | Dasgupta et al. |
| 2021/0150384 | A1 | 5/2021 | Dasgupta et al. |
| 2022/0027082 | A1 | 1/2022 | Okuyama et al. |

OTHER PUBLICATIONS

Multiple Equality and Inequality Constraints, Wolak, 1987; https://web.stanford.edu/group/fwolak/cgi-bin/sites/default/files/files/An%20Exact%20Test%20for%20Multiple%20Equality%20and%20Inequality%20Constraints%20in%20the%20Linear%20Regression%20Model_Wolak(1).pdf (Year: 1987).*

Barnhart et al., "Branch-and-price: Column generation for solving huge integer programs," Operations Research, vol. 46, No. 3, 1998, pp. 316-329.

"Bean, ""Genetic algorithms and random keys for sequencing and optimization."" ORSA Journal on Computing, vol. 6, No. 2, 1994, pp. 154-160."

Hyndman et al., "Optimal combination forecasts for hierarchical time series," Computational Statistics & Data Analysis, vol. 55, No. 9, 2011, pp. 2579-2589.

"Laptev et al., ""Time-series extreme event forecasting with neural networks at uber,"" International Conference on Machine Learning, No. 34, 2017, 5 pages."

Talagala et al., "Meta-Learning How to Forecast Time Series", Monash University, Department of Econometrics and Business Statistics, Apr. 30, 2018.

Zhu et al., "Deep and confident prediction for time series at uber," Data Mining Workshops (ICDMW), 2017 IEEE International Conference on Data Mining Workshops, IEEE, 2017, 8 pages.

Kuck et al., "Meta-Learning with Neural Networks and Landmarking for Forecasting Model Selection an Empirical Evaluation of Different Feature Sets Applied to Industry Data," 2016 International Joint Conference On Neural Networks (IJCNN), IEEE, Jul. 24, 2016 (Jul. 24, 2016), pp. 1499-1506, XP032992342, DOI: 10.1109/IJCNN.2016.7727376.

Prudencio et al., "Meta-Learning Approaches to Selecting Time Series Models," Neurocomputing, Elsevier, Amsterdam, NL, vol. 61, Oct. 1, 2004 (Oct. 1, 2004), ISSN: 0925-2312, DOI: 10.1016/J.Neucom.2004.03.008.

Wang et al., "Rule Induction for Forecasting Method Selection: Meta-Learning the Characteristics of Univariate Time Series," Neurocomputing, Elsevier, Amsterdam, NL, vol. 72, No. 10-12, Jun. 1, 2009 (Jun. 1, 2009), pp. 2581-2594, XP026093465, ISSN: 0925-2312, DOI: 10.1016/J.Neucom.2008.10.017.

* cited by examiner

HIERARCHICAL DEEP NEURAL NETWORK FORECASTING OF CASHFLOWS WITH LINEAR ALGEBRAIC CONSTRAINTS

CROSS-REFERENCE TO RELATED APPLICATIONS

This Patent Application is a Continuation Application of and claims priority to U.S. patent application Ser. No. 16/688,927 entitled "HIERARCHICAL DEEP NEURAL NETWORK FORECASTING OF CASHFLOWS WITH LINEAR ALGEBRAIC CONSTRAINTS" filed on Nov. 19, 2019, now U.S. Pat. No. 11,423,250, which is assigned to the assignee hereof. The disclosures of all prior Applications are considered part of and are incorporated by reference in this Patent.

TECHNICAL FIELD

This disclosure relates generally to methods for operating neural networks, and specifically to appropriately configuring, training and operating neural networks to forecast cashflows among financial accounts.

DESCRIPTION OF RELATED ART

Individuals or businesses may have multiple accounts, such as savings accounts, checking accounts, credit accounts, and so on. The contents of these accounts may vary over time, for example, due to income, deposits, withdrawals, various expenses, and other credits or debits. Properly monitoring the contents of such accounts may be important not only to avoid overdrafts, but also to ensure sufficient cashflow for personal and business operations, and may also be used for accounting and tax purposes. Forecasting the future cashflows of a user's accounts may allow the user to better plan their activities and expenses over time.

Accordingly, there is a need for improved forecasting of the cashflows of a user's accounts over time.

SUMMARY

This Summary is provided to introduce in a simplified form a selection of concepts that are further described below in the Detailed Description. This Summary is not intended to identify key features or essential features of the claimed subject matter, nor is it intended to limit the scope of the claimed subject matter. Moreover, the systems, methods and devices of this disclosure each have several innovative aspects, no single one of which is solely responsible for the desirable attributes disclosed herein.

One innovative aspect of the subject matter described in this disclosure can be implemented as a method for forecasting cashflows across one or more accounts of a user. The method can be performed by one or more processors of a computing device associated with a deep neural network (DNN), and can include retrieving a data set for each of a plurality of accounts from a database, each data set including a plurality of financial transactions of the corresponding account; constructing a graph including a plurality of nodes linked together by a multitude of edges, wherein each of the nodes identifies a time series value corresponding to one of the accounts, and each of the edges indicates a time series value of a corresponding set of transactions occurring between a corresponding pair of accounts; determining a plurality of constraints associated with a time series prediction for each node of the plurality of nodes; determining a specified loss function based on the plurality of constraints; back-propagating a derivative of the specified loss function into the DNN to determine a set of neural network parameters; forecasting, using the DNN, a time sequence for each of one or more nodes of the plurality of nodes and for each of one or more edges of the multitude of edges based at least in part on the set of neural network parameters; and providing the forecasted time sequences to the user. Each of the transactions indicated by a respective edge of the multitude of edges has a common transaction type, and each transaction type includes one of deposits, withdrawals, expenses, payments, or inter-account transfers. In some aspects, the plurality of constraints include one or more equality constraints, one or more inequality constraints, and one or more log-likelihood constraints.

In some implementations, the specified loss function is based at least in part on forecasted error squared metrics for the equality constraints or the inequality constraints. The equality constraints are constrained by a forecasted value for each respective node at a time t+1 being equal to the forecasted value for the respective node at a time t summed with the edges linking the respective node to other nodes in the graph at the time t. In other implementations, the specified loss function is based at least in part on respective weighting factors for each of the equality constraints, the inequality constraints, and the log-likelihood constraints.

In some implementations, forecasting the time sequence for each node of the plurality of nodes includes forecasting a forecasted daily value of the corresponding account. In such implementations, forecasting the time sequence for each node of the plurality of nodes can include forecasting one or more of a weekly value or a monthly value of the corresponding account, and the plurality of constraints are constrained by the forecasted weekly value of the corresponding account being equal to the average forecasted daily value of the corresponding account during a corresponding week and the forecasted monthly value of the corresponding account being equal to the average forecasted daily value of the corresponding account during a corresponding month.

Another innovative aspect of the subject matter described in this disclosure can be implemented in a system for forecasting cashflows across one or more accounts of a user. The system, which can be associated with a deep neural network (DNN), can include one or more processors and a memory. The memory is coupled to the one or more processors, and stores instructions that, when executed by the one or more processors, causes the system to perform operations including retrieving a data set for each of a plurality of accounts from a database, each data set including a plurality of financial transactions of the corresponding account; constructing a graph including a plurality of nodes linked together by a multitude of edges, wherein each of the nodes identifies a time series value corresponding to one of the accounts, and each of the edges indicates a time series value of a corresponding set of transactions occurring between a corresponding pair of accounts; determining a plurality of constraints associated with a time series prediction for each node of the plurality of nodes; determining a specified loss function based on the plurality of constraints; back-propagating a derivative of the specified loss function into the DNN to determine a set of neural network parameters; forecasting, using the DNN, a time sequence for each of one or more nodes of the plurality of nodes and for each of one or more edges of the multitude of edges based at least in part on the set of neural network parameters; and providing the forecasted time sequences to the user. Each of the transactions indicated by a respective edge of the multitude of edges has a common transaction type, and each transaction type includes one of deposits, withdrawals, expenses, payments, or inter-account transfers. In some aspects, the plurality of constraints include one or more equality constraints, one or more inequality constraints, and one or more log-likelihood constraints.

In some implementations, the specified loss function is based at least in part on forecasted error squared metrics for the equality constraints or the inequality constraints. The equality constraints are constrained by a forecasted value for each respective node at a time t+1 being equal to the forecasted value for the respective node at a time t summed with the edges linking the respective node to other nodes in the graph at the time t. In other implementations, the specified loss function is based at least in part on respective weighting factors for each of the equality constraints, the inequality constraints, and the log-likelihood constraints.

In some implementations, forecasting the time sequence for each node of the plurality of nodes includes forecasting a forecasted daily value of the corresponding account. In such implementations, forecasting the time sequence for each node of the plurality of nodes can include forecasting one or more of a weekly value or a monthly value of the corresponding account, and the plurality of constraints are constrained by the forecasted weekly value of the corresponding account being equal to the average forecasted daily value of the corresponding account during a corresponding week and the forecasted monthly value of the corresponding account being equal to the average forecasted daily value of the corresponding account during a corresponding month.

Another innovative aspect of the subject matter described in this disclosure can be implemented in a non-transitory computer-readable medium. The non-transitory computer-readable medium stores instructions that, when executed by one or more processors of a computing device, cause the computing device to forecast cashflows across one or more accounts of a user using a deep neural network (DNN) by performing operations including retrieving a data set for each of a plurality of accounts from a database, each data set including a plurality of financial transactions of the corresponding account; constructing a graph including a plurality of nodes linked together by a multitude of edges, wherein each of the nodes identifies a time series value corresponding to one of the accounts, and each of the edges indicates a time series value of a corresponding set of transactions occurring between a corresponding pair of accounts; determining a plurality of constraints associated with a time series prediction for each node of the plurality of nodes; determining a specified loss function based on the plurality of constraints; back-propagating a derivative of the specified loss function into the DNN to determine a set of neural network parameters; forecasting, using the DNN, a time sequence for each of one or more nodes of the plurality of nodes and for each of one or more edges of the multitude of edges based at least in part on the set of neural network parameters; and providing the forecasted time sequences to the user. Each of the transactions indicated by a respective edge of the multitude of edges has a common transaction type, and each transaction type includes one of deposits, withdrawals, expenses, payments, or inter-account transfers. In some aspects, the plurality of constraints include one or more equality constraints, one or more inequality constraints, and one or more log-likelihood constraints.

BRIEF DESCRIPTION OF THE DRAWINGS

The example implementations are illustrated by way of example and are not intended to be limited by the figures of the accompanying drawings. Like numbers reference like elements throughout the drawings and specification. Note that the relative dimensions of the following figures may not be drawn to scale.

DETAILED DESCRIPTION

Implementations of the subject matter described in this disclosure may be used to forecast future balances across a user's multiple accounts. Such forecasting may be performed using a deep neural network (DNN) which has been trained using historical data including the contents of the user's accounts and a record of the historical transactions involving those accounts. Further, the DNN may be trained to satisfy a plurality of constraints on the forecasted balances, for example, to allow the various implementations disclosed herein to function as a "virtual accountant" by ensuring that a predicted balance for a given account on a given day should match the previous day's balance summed with the forecasted transactions involving the given account from the previous day. The incorporation of such constraints into the DNN may also allow the various implementations disclosed herein to generate not only more accurate forecasts, but also account balance forecasts that are consistent with the structure and topology of a user's accounts. Providing forecasts consistent with the user's account structure may be more useful as it may reduce or eliminate additional work the user must perform for example, to ensure the predicted account balances agree with the predicted inflows and outflows.

Various implementations of the subject matter disclosed herein provide one or more technical solutions to the technical problem of forecasting cashflows across one or more accounts of a user by using a deep neural network (DNN) to construct a graph including a plurality of nodes linked together by a multitude of edges, where each of the nodes identifies a time series value corresponding to one of the accounts and each of the edges indicates a time series value of a corresponding set of transactions occurring between a corresponding pair of accounts, and then forecasting a time sequence for each of the plurality of nodes and for each of the multitude of edges based at least in part on a set of neural network parameters configured to minimize a specified loss function based on one or more constraints. More specifically, various aspects of the present disclosure provide a unique computing solution to a unique computing problem that did not exist prior to electronic or online financial forecasting systems that can forecast the time sequences with greater accuracy and less time than conventional techniques. As such, implementations of the subject matter disclosed herein are not an abstract idea such as organizing human activity or a mental process that can be performed in the human mind.

Moreover, various aspects of the present disclosure effect an improvement in the technical field of forecasting cash-flows across any number of user accounts by constructing specific types of graphs that identify the user accounts and that indicate transactions occurring between various pairs of the user accounts in a specific technological way, and forecasts time sequences for each of the user accounts based at least in part on sets of neural network parameters configured to minimize a specified loss function based on one or more constraints. The construction of these specific types of graphs, as well as their use in a deep neural network (DNN) to forecast time sequences for the user accounts, cannot be performed in the human mind, much less using pen and paper. In addition, implementations of the subject matter disclosed herein do far more than merely create contractual relationships, hedge risks, mitigate settlement risks, and the like, and therefore cannot be considered a fundamental economic practice.

Figure 1:
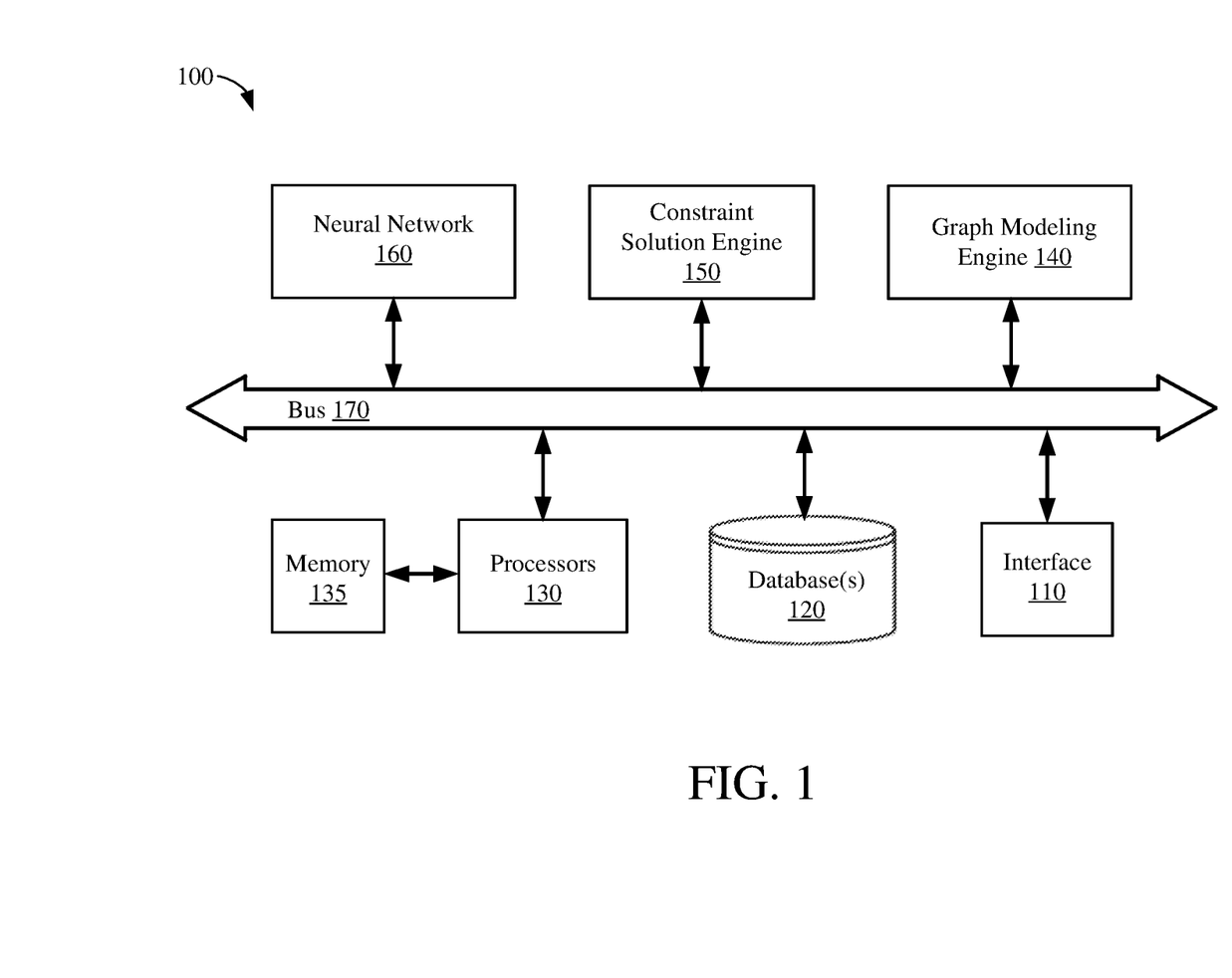
FIG. 1 shows an example account balance forecasting system, according to some implementations.

FIG. 1 shows an account balance forecasting system 100, according to some implementations. Although described herein with respect to forecasting account balances and transactions associated with a plurality of accounts of a user, various aspects of the account balance forecasting system 100 disclosed herein may be applicable for forecasting balances or contents of any plurality of accounts for which historical data is available.

The account balance forecasting system 100 is shown to include an input/output (I/O) interface 110, a database 120, one or more data processors 130, a memory 135 coupled to the data processors 130, a graph modeling engine 140, a constraint solution engine 150, and a neural network 160. In some implementations, the various components of the account balance forecasting system 100 may be interconnected by at least a data bus 170, as depicted in the example of FIG. 1. In other implementations, the various components of the account balance forecasting system 100 may be interconnected using other suitable signal routing resources.

The interface 110 may include a screen, an input device, and other suitable elements that allow a user to provide information to the account balance forecasting system 100 and/or to retrieve information from the account balance forecasting system 100. Example information that can be provided to the account balance forecasting system 100 may include historical transaction data for one or more accounts. Example information that can be retrieved from the account balance forecasting system 100 may include forecasted date for one or more accounts, such as forecasted account mean data or forecasted account standard deviation data, forecasted mean or standard deviation data for one or more transactions involving one or more accounts, one or more sets of parameters for the DNN, and the like.

The database 120, which may represent any suitable number of databases, may store any suitable information pertaining to each of a plurality of accounts registered with one or more users of the account balance forecasting system 100. For example, the information may include historical data about each of the plurality of accounts (such as historical account balance and transaction data), may include account information (such as historical account balances, transaction histories, and so on), may include owner information (such as phone numbers, email addresses, physical mailing address, SSNs, and so on), and may include related information (such as bank names, bank account numbers, and so on). In some implementations, the database 120 may be a relational database capable of presenting the information as data sets to a user in tabular form and capable of manipulating the data sets using relational operators. In some aspects, the database 120 may use Structured Query Language (SQL) for querying and maintaining the database 120.

The data processors 130, which may be used for general data processing operations (such as manipulating the data sets stored in the database 120), may be one or more suitable processors capable of executing scripts or instructions of one or more software programs stored in the account balance forecasting system 100 (such as within the memory 135). The data processors 130 may be implemented with a general purpose single-chip or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. In one or more implementations, the data processors 130 may be implemented as a combination of computing devices (such as a combination of a DSP and a microprocessor, a plurality of microprocessors, one or more microprocessors in conjunction with a DSP core, or any other such configuration).

The memory 135, which may be any suitable persistent memory (such as non-volatile memory or non-transitory memory) may store any number of software programs, executable instructions, machine code, algorithms, and the like that can be executed by the data processors 130 to perform one or more corresponding operations or functions. In some implementations, hardwired circuitry may be used in place of, or in combination with, software instructions to implement aspects of the disclosure. As such, implementations of the subject matter disclosed herein are not limited to any specific combination of hardware circuitry and/or software.

The graph modeling engine 140 may be used to present the interrelationships and common attributes of the accounts for use by the neural network 160, or for presentation in a visual form to the user. The modeling engine 140 may construct one or more network graphs indicating various links, connections, and commonalities of a plurality of accounts based on financial transaction data. In some implementations, the modeling engine 140 may use the account data sets stored in the database 120 to construct a network graph that includes a plurality of nodes linked together by a multitude of edges, wherein each of the nodes identifies a corresponding one of the accounts, and each of the edges indicates one or more transactions common to a corresponding pair of accounts linked by the edge.

The constraint solution engine 150 may be used to determine a plurality of constraints that forecasted account data should satisfy, and to determine a set of neural network parameters that minimize a specified loss function which is based on the plurality of constraints. In some implementations, the constraint solution engine 150 may apply weighting factors or priorities to one or more of the constraints, as discussed further below.

The neural network 160 may store any number of machine learning models that can be used to forecast account cash flows for one or more accounts represented by network graphs created by or modeled using graph modeling engine 140. A machine learning model can take the form of an extensible data structure that can be used to represent sets of words or phrases and/or can be used to represent sets of attributes or features. The machine learning models may be seeded with historical account data indicating time series account balances and transactions for a plurality of accounts. In some implementations, the neural network 160 may be a deep neural network (DNN), which may have any suitable architecture, such as a feedforward architecture or a recurrent architecture. As discussed below, the DNN may be trained using a set of parameters corresponding to constraints such as a negative log likelihood probability, one or more equality constraints, and one or more inequality constraints.

The particular architecture of the account balance forecasting system 100 shown in FIG. 1 is but one example of a variety of different architectures within which aspects of the present disclosure may be implemented. For example, in other implementations, the account balance forecasting system 100 may not include a constraint solution engine 150, the functions of which may be implemented by the processors 130 executing corresponding instructions or scripts stored in the memory 135. In some other implementations, the functions of the graph modeling engine 140 may be performed by the processors 130 executing corresponding instructions or scripts stored in the memory 135. Similarly, the functions of the neural network 160 may be performed by the processors 130 executing corresponding instructions or scripts stored in the memory 135.

Figure 2:
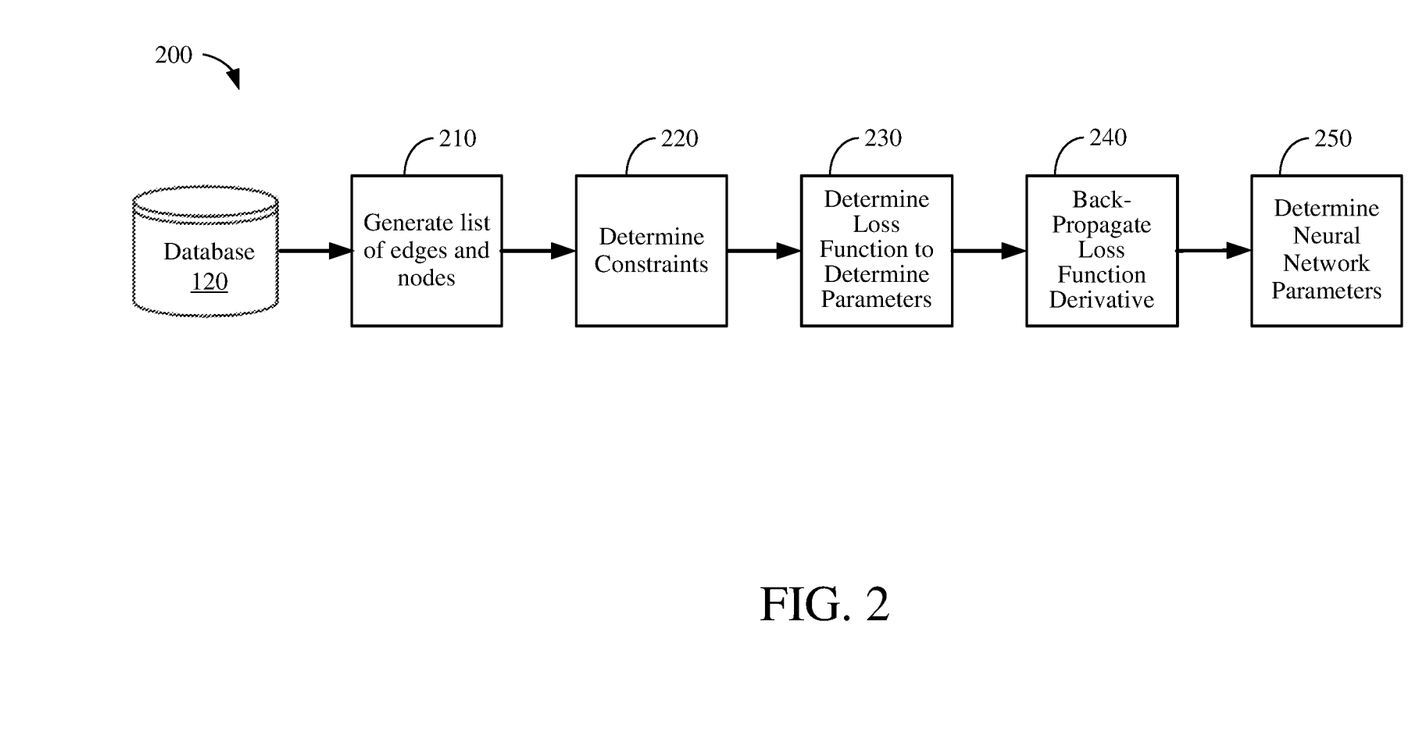
FIG. 2 shows an example process flow that may be employed by the account balance forecasting system of FIG. 1, according to some implementations.

FIG. 2 shows a high-level overview of an example process flow 200 that may be employed by the account balance forecasting system 100 of FIG. 1. In block 210, account data retrieved from the database 120 is used to generate a network graph including a plurality of nodes linked together by a multitude of edges. Each of the nodes identifies a time series value corresponding to one of the accounts, and each of the edges indicates a time series value of a corresponding set of transactions occurring between a corresponding pair of accounts. A table listing the edges and nodes of the network graph may be generated. At block 220, a plurality of constraints on the nodes and edges of the generated network graph may be determined. At block 230, a loss function may be determined based on the plurality of constraints At block 240, a derivative of the loss function may be back-propagated into the neural network 160. At block 250, the back-propagated loss function derivative may be used in order to determine a set of neural network parameters. The determined set of neural network parameters may be a set of neural network parameters which minimize the loss function, and thus best satisfy the plurality of constraints In some implementations, the neural network 160 may be trained using the determined loss function to determine or identify the set of parameters which configure the neural network 160 to forecast cashflows which best satisfy the plurality of constraints. The trained neural network may then forecast a time sequence for each of one or more nodes of the plurality of nodes and for each of one or more edges of the multitude of edges.

Figure 3:
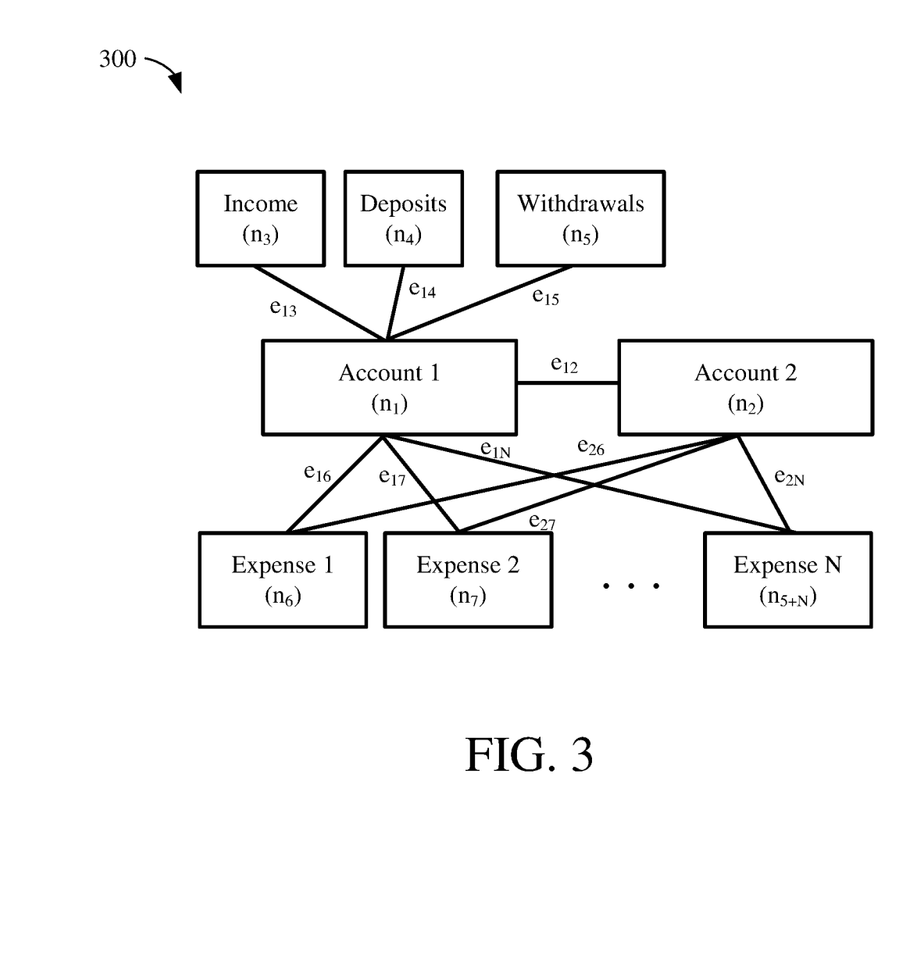
FIG. 3 shows an example network graph which may be used in combination with example methods for forecasting cashflows, according to some implementations

FIG. 3 shows an example network graph 300 which may be used in combination with example methods for forecasting cashflows, according to some implementations. As described above, account data may be received from a database (such as the database 120 of FIG. 2). This account data may include, for example, time sequences of account balance data and transaction data for each of a plurality of accounts. Such account data may be used for constructing a directed graph, such as network graph 300, where each node of the network graph 300 may correspond to an account of the account data, and each edge of the network graph 300 may correspond to a transaction between two accounts. Note that the term "account" for purposes of this disclosure may correspond to one or more of a savings account, a checking account, a credit account, and so on. Further, the term "account" may also refer to a destination of positive or negative cashflow—for example, a type of income, a type of expense, a deposit, or a withdrawal from an account.

The network graph 300 includes a plurality of nodes, where the i-th node is identified by $n_i$, such as account 1 ($n_1$), account 2 ($n_2$), income ($n_3$), deposits ($n_4$), withdrawals ($n_5$), and expenses 1 through N ($n_6$–$n_{5+N}$). The network graph 300 may also include edges between nodes, where an edge between a first node and a second node corresponds to a transaction between the account corresponding to the first node and the account corresponding to the second node. An edge between the i-th node and the j-th node may be referred to as $e_{ij}$. Note that the network graph 300 is a directed graph, such that $e_{ij}=-e_{ji}$ for i≠j. For example, a transaction between account 1 ($n_1$) and account 2 ($n_2$) may be denoted $e_{12}$. Note that there may not be an edge between each node in the network graph, for example because no transactions occur between the corresponding accounts. For example, if a node corresponds to a type of expense, or income, rather than an account—for example nodes $n_3$–$n_{5+N}$ in FIG. 3—may have edges connecting only to nodes $n_1$ and $n_2$—the nodes corresponding to account 1 and account 2. Finally, while the edges and nodes of network graph 300 are not shown as time-dependent, values of each node and edge may vary over time. In some aspects the time series may be provided on a daily level, such that t+1 is a time one day after t. In some other aspects the time series may be provided on a weekly level, a monthly level, or another suitable time scale. For example, when data is provided on a daily level, an account balance of account 1 ($n_1$) may have a value of $1000 on day t, and $800 on day t+1. This time dependency may be represented by noting that $n_1(t)=\$1000$, and $n_1(t+1)=\$800$.

As discussed above, properly monitoring the contents of an individual's accounts or a business' accounts may be important not only to avoid overdrafts, but also to ensure sufficient cashflow for personal and business operations, and for accounting and tax purposes. Forecasting the future contents of a user's accounts may allow the user to better plan their activities and expenses over time. While conventional neural networks have been trained to perform such forecasting, they fail to account for other considerations which are vitally important in the context of cashflow forecasting. Such considerations may be expressed as constraints among the plurality of accounts. Conventional approaches may fail to account for one or more equality constraints such as, for example, constraining a predicted balance in an account on a given day to be equal to the predicted balance from the previous day summed with that account's predicted transactions from the previous day. These constraints may also include one or more inequality constraints such as, for example, constraining a predicted account balance to be above or below a specified amount. For example, an owner of an account may have an automatic deposit coupled to a given account, constraining the balance not to drop below a specified amount, or an automatic withdrawal coupled to a given account, constraining the account balance to a specified maximum. Although conventional cashflow forecasting systems may not consider such constraints, cashflow predictions incorporating these constraints may be very helpful to an individual or a business, not only allowing for more accurate forecasts, but also allowing the forecasts to more accurately reflect account balances, thus functioning as a kind of "virtual accountant" in addition to a forecaster of future account balances.

Further, existing time series forecasting algorithms are typically limited to simple linear models and cannot account for the large scale and complex transactional data present in the cashflow forecasting environment. Consequently, such algorithms may not be used in cashflow forecasting environments. Therefore, it is desirable to provide improved cashflow forecasting methods and systems which may account for network flow constraints. Accordingly, the example implementations provide methods and systems for cashflow forecasting which accounts for such network flow constraints. The example methods and systems may be implemented using deep neural networks (DNNs). Such DNNs may have any suitable architecture, such as a feedforward architecture or a recurrent architecture.

As discussed above with respect to FIG. 3, time series account data for a plurality of accounts may be used to construct a network graph, where nodes of the network graph correspond to accounts of the account data, and edges of the network graph correspond to transactions between accounts in the network data. For example, the set of nodes may include a plurality of nodes $n_i$, for i between 1 and $N_{Nodes}$ and a multitude of edges $e_{ij}$ between the i-th node and the j-th node, where i≠j and i and j are between 1 and $N_{Nodes}$. Using this notation, transactions between accounts are subject to network flow constraints, such that $n_i(t+1)=n_i(t)+\Sigma_{j\neq i}e_{ij}(t)$. As discussed above, such network flow constraints may be examples of equality constraints. Further, one or more inequality constraints may apply to one or more nodes or edges, for example if an account is constrained to have a specified minimum or maximum value such a constraint may respectively be represented as $n_i(t) \geq \alpha$ or $n_i(t) \leq \beta$. Similar inequality constraints may apply to one or more edges of the network graph.

In some aspects, forecasted time series data for the nodes and edges of the network graph may referred to in terms of their forecasted means and standard deviations. For example, $\mu_i^n(t, \omega)$ and $\sigma_i^n(t, \omega)$ may respectively refer to the time series forecasted mean and standard deviation for the i-th node at time t. The term co may refer to a set of parameters for a DNN used to generate the forecasted node data. Similarly, $\mu_{ij}^e(t, \omega)$ and $\sigma_{ij}^e(t, \omega)$ may respectively refer to the time series forecasted mean and standard deviation for the edge coupling the i-th node to the j-th node at time t. In the above-described implementations the probability distribution of the amounts are assumed to be Gaussian, and thus specifying the mean $\mu_i^n(t, \omega)$ and the standard deviation $\sigma_i^n(t, \omega)$ suffice to describe the probability distribution in its entirety. If the probability distributions have distributions which are not Gaussian, other parameters related to the amount distribution may be specified, and a corresponding formulation of the neural network may be determined based on that distribution.

As discussed above, a plurality of constraints may apply to the forecasted time series data. In some implementations, the plurality of constraints may include one or more equality constraints, one or more inequality constraints, and additionally one or more log-likelihood constraints. For example, the equality constraints may include one or more network flow constraints, which may be expressed as $\mu_i^n(t+1, \omega)=\mu_i^n(t, \omega)+\Sigma_{j\neq i}\mu_{ij}^e(t, \omega)$. Such a network flow constraint may help to ensure forecasted account values agree with the forecasted transactions. In addition to the equality constraints, one or more inequality constraints may apply to the forecasted time series data. For example, as discussed above, an account may have a minimum or a maximum value, due to an account owner's automatic deposits or withdrawals for example. When an account is required to have a minimum value, a corresponding inequality constraint may be represented as $\mu_i^n(t, \omega) \geq \varepsilon_n$, where $\varepsilon_n$ refers to the minimum value.

In addition, or in the alternative, one or more log-likelihood constraints may apply to the forecasted time data. For example, the one or more log-likelihood constraints may include one or more negative log-likelihood losses and penalties corresponding to constraints, such that the one or more negative log-likelihood losses and penalties are to be minimized when forecasting the time series. The negative log-likelihood may include a node-based negative log-likelihood component and an edge-based negative log-likelihood component, such that NLLH=NLLH$_n$ +NLLH$_e$, where NLLH represents the negative log-likelihood, NLLH$_n$ represents the node-based negative log-likelihood component, and NLLH$_e$ represents the edge-based negative log-likelihood component. In some aspects, $$NLLH_n = \frac{1}{2}\sum_{i,t} \frac{(n_i(t) - \mu_i^n(t, \omega))^2}{(\sigma_i^n(t, \omega))^2} + \sum_{i,t} \log\left(\sqrt{2\pi}\, \sigma_i^n(t, \omega)\right),$$

and $$NLLH_e = \frac{1}{2}\sum_{i,j,t,j\neq i} \frac{(e_{ij}(t) - \mu_{ij}^e(t, \omega))^2}{(\sigma_{ij}^e(t, \omega))^2} + \sum_{i,j,t,j\neq i} \log\left(\sqrt{2\pi}\, \sigma_{ij}^e(t, \omega)\right).$$

In order to determine appropriate parameters for the DNN, an optimization problem may be solved, where the optimization problem is based on the plurality of constraints. Such an optimization problem may be called a loss function, or a global loss function for the DNN. An example optimization problem may be to determine the set of DNN parameters co satisfying Argmin$_\omega(\lambda_L$NLLH+$\lambda_E$E+$\lambda_I$I). The sum $\lambda_L$NLLH+$\lambda_E$E+$\lambda_I$I may be the loss function, or global loss function for the DNN, and the DNN parameters which minimize this loss function are the most appropriate DNN parameters for forecasting cashflows which respect the equality and inequality constraints, as well satisfying the log-likelihood constraints. The terms $\lambda_L$, $\lambda_E$, and $\lambda_I$ represent nonnegative weights for respective negative log-likelihood constraints, equality constraints, and inequality constraints, such that $\lambda_L+\lambda_E+\lambda_I=1$. NLLH may be as defined above, including a sum of the respective node-based and edge-based negative log-likelihood components. E may be a loss function component corresponding to the equality constraints. For example E may be defined as $E=\Sigma_{i,t}(\xi_i^n(t+1))^2$, where $\xi_i^n(t+1)=\mu_i^n(t+1, \omega)-\mu_i^n(t, \omega)-\Sigma_{j\neq i}\mu_{ij}^e(t, \omega)$. Further, I may be a loss function component corresponding to the inequality constraints. For example, when one or more nodes are constrained to have a minimum value $\varepsilon^n$, then I may be defined as $I=\Sigma_{i,t}(\zeta_i^n(t))^2$, where $\zeta_i^n(t)=(\mu_i^n(t, \omega)-\varepsilon_n)_+$, where $(\cdot)_+$ operator represents non-negative minimum. Note that I and E may also be referred to as penalties relating to the respective inequality and equality constraints.

In order to solve this optimization problem for the most appropriate DNN parameters, the DNN may be trained using training data. Such training data may be an appropriate subset of the historical data from the plurality of accounts, such as a table or vector comprising time series data from each node and edge of the network graph. For example, such a vector may include values for each node and each edge on each of a number of consecutive days. The loss function, in combination with the training data, may be used with an appropriate algorithm to determine the DNN parameters. In the training step, the gradient or derivative of the loss function is backpropagated through the layers of the DNN iteratively to reach the optimal values of the DNN parameters. In some aspects, a stochastic gradient descent (SGD) algorithm may be used for determining the DNN parameters based on a gradient of the loss function. The DNN parameters may first be set to a set of initial values. In some aspects these initial values may be determined using appropriate weight initialization methods. In one example, the initial values may be selected to be small and randomly or pseudo randomly selected. A number of iterations may be performed, where in each iteration a portion of the training data is sent to the DNN, and one or more forecasted values are determined based on the current DNN parameters. During each iteration a loss function gradient may be determined, and a small update to the DNN parameters may be performed, for example based on the loss function gradient. Training the DNN using the loss function and the training data thus optimizes the DNN parameters to model not only the time series historical data, but also the relationships between accounts of the historical data—in other words, the equality and inequality constraints.

After the DNN has been trained using the training data and the loss function, the trained DNN may forecast one or more time sequences for the nodes of the network graph corresponding to the historical data. The trained DNN may also forecast one or more time sequences for the edges of the network graph. In some aspects, the DNN may forecast a time sequence for each node of the plurality of nodes of the network graph. In some other aspects, the DNN may forecast a time sequence for each edge of the multitude of edges of the network graph. One or more of these forecasted time sequences may then be provided to the user, for example via interface 110 of FIG. 1.

Figure 4A:
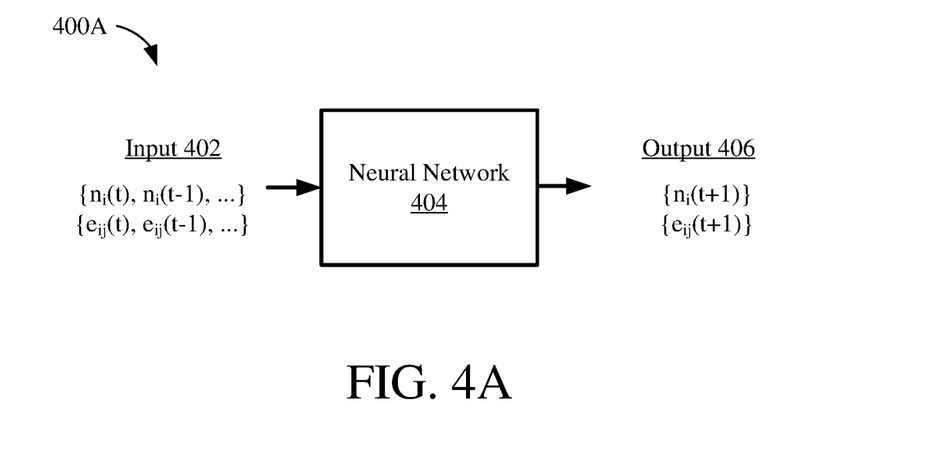
FIGS. 4A-4B show example inputs and outputs for neural networks configured for forecasting cashflows, according to some implementations.

As mentioned above, the example implementations disclosed herein may be used with various DNN architectures. For example, FIG. 4A shows an example feedforward network 400A, having an input 402 and an output 406, which may be used to forecast one step ahead of the historical data, in accordance with some implementations. More particularly, input 402 may include historical data for nodes and edges of the network graph for times t, t−1, t−2, and so on. The neural network 404, after appropriate training, may then forecast one step ahead, in other words, forecasting node and edge data for time t+1.

Figure 4B:
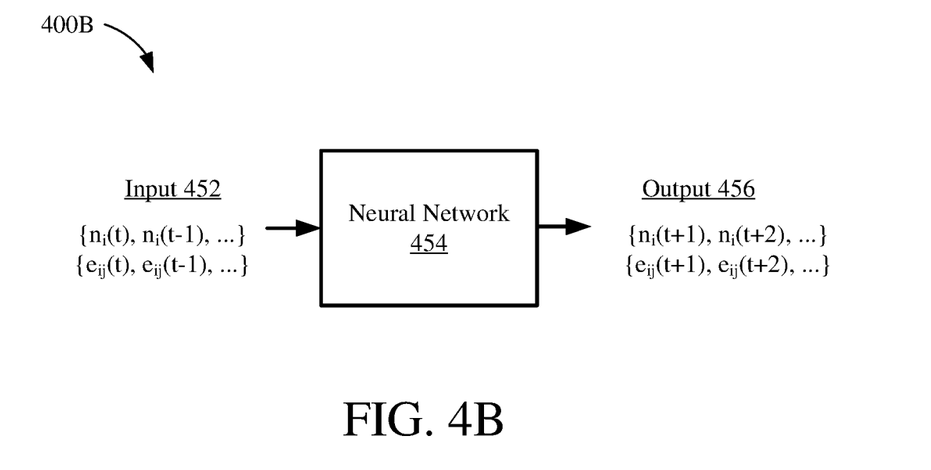

For another example, FIG. 4B shows an example recurrent network 400B, having an input 452 and an output 456, which may be used to forecast multiple steps ahead of the historical data, in accordance with some implementations. In some examples, recurrent network 400B may include a DNN having a long short-term memory (LSTM) architecture. In contrast to feedforward network 400A, the recurrent network 400B may provide longer term forecasts of node and edge data, for example, providing forecasts for times t+1, t+2, and so on, rather than simply for time t+1 as in feedforward network 400A. In some aspects, forecasted node and edge data may be fed back into input 452 in order to generate longer term forecasts. In some aspects the input 452 may include node and edge data over a specified first window of time, and output 456 may include forecasted node and edge data over a corresponding second window of time— this may be called a "sequence to sequence" model.

While the previous implementations have discussed forecasting cashflows on a daily basis, other implementations may forecast cashflows on other timescales, or on multiple timescales. For example, according to some implementations, forecasts may be made for daily, weekly, and monthly time sequences. For example, let $n_i^d(t)$ represent the actual daily value of the i-th node at the time t, $n_i^w(t)$ represent the actual weekly value of the i-th node at the time t, and $n_i^m(t)$ represent the actual monthly value of the i-th node at the time t. Similarly, let $e_{ij}^d(t)$ represent the actual daily value of the edge between the i-th node and the j-th node at the time t, $e_{ij}^w(t)$ represent the actual weekly value of the edge between the i-th node and the j-th node at the time t, and $e_{ij}^m(t)$ represent the actual monthly value of the edge between the i-th node and the j-th node at the time t. Similarly, respective daily, weekly, and monthly forecasted means and standard deviations for node i at time t may be given as $\mu_i^{n,d}(t, \omega)$, $\sigma_i^{n,d}(t, \omega)$ (daily), $\mu_i^{n,w}(t, \omega)$, $\sigma_i^{n,w}(t, \omega)$ (weekly), and $\mu_i^{n,m}(t, \omega)$, $\sigma_i^{n,m}(t, \omega)$ (monthly). Similarly, respective daily, weekly, and monthly forecasted means and standard deviations for edge $e_{ij}(t)$ may be given as $\mu_{ij}^{e,d}(t, \omega)$, $\sigma_{ij}^{e,d}(t, \omega)$ (daily), $\mu_{ij}^{e,w}(t, \omega)$, $\sigma_{ij}^{e,w}(t, \omega)$ (weekly), and $\mu_{ij}^{e,m}(t, \omega)$, $\sigma_{ij}^{e,m}(t, \omega)$ (monthly).

In addition to the network flow constraints described above, when concurrently forecasting for daily, weekly, and monthly values, the equality constraints may further include time scale consistency constraints, such as the constraint that forecasted average weekly values correspond with the average forecasted daily values during the corresponding week, and that the forecasted average monthly values correspond with the average forecasted daily values during the corresponding month (for simplicity, a 30 day period may be substituted for the varying length of each month). Thus, the equality constraints may include respective daily, weekly, and monthly network flow constraints $\mu_i^{n,d}(t+1, \omega) = \mu_i^{n,d}(t, \omega) + \Sigma_{j \neq i} \mu_{ij}^{e,d}(t, \omega)$, $\mu_i^{n,w}((t+1, \omega) = \mu_i^{n,w}(t, \omega) + \Sigma_{j \neq i} \mu_{ij}^{e,w}(t, \omega)$, and $\mu_i^{n,m}(t+1, \omega) = \mu_i^{n,m}(t, \omega) + \Sigma_{j \neq i} \mu_{ij}^{e,m}(t, \omega)$. The weekly time scale consistency constraints for nodes and edges may be given as $\mu_i^{n,w}(t, \omega) = \frac{1}{7} \Sigma_{k=0}^{6} \mu_i^{n,d}(t-k, \omega)$ and $\mu_{ij}^{e,w}(t, \omega) = \frac{1}{7} \Sigma_{k=0}^{6} \mu_{ij}^{e,d}(t-k, \omega)$. Similarly, the monthly time scale consistency constraints for nodes and edges may be given as $\mu_i^{n,m}(t, \omega) = \frac{1}{30} \Sigma_{k=0}^{29} \mu_i^{n,d}(t-k, \omega)$ and $\mu_{ij}^{e,m}(t, \omega) = \frac{1}{30} \Sigma_{k=0}^{29} \mu_{ij}^{e,d}(t-k, \omega)$.

The inequality constraints for concurrent daily, weekly, and monthly forecasts may respectively be given as $\mu_i^{n,d}(t, \omega) \geq \varepsilon_d$, $\mu_i^{n,w}(t, \omega) \geq \varepsilon_w$, and $\mu_i^{n,m}(t, \omega) \geq \varepsilon_m$ for inequality constrains constraining account balances to be above respective average daily, weekly, and monthly thresholds $\varepsilon_d$, $\varepsilon_w$, and $\varepsilon_m$. Note that as described above, other inequality constraints may apply, such as a constraint that an account has a maximum value, a limit to the size of transactions on a given day (limiting the value of an edge), and so on.

The negative log-likelihood for the concurrent daily, weekly, and monthly forecasts may be given as $\text{NLLH} = \text{NLLH}_{d,n} \text{NLLH}_{w,n} \text{NLLH}_{m,n} \text{NLLH}_{d,e} \text{NLLH}_{w,e} + \text{NLLH}_{m,e}$, where $$NLLH_{d,n} = \frac{1}{2} \sum_{k,t} \frac{(n_i(t) - \mu_i^{n,d}(t, \omega))^2}{(\sigma_i^{n,d}(t, \omega))^2} + \sum_{k,t} \log\left(\sqrt{2\pi} \, \sigma_i^{n,d}(t, \omega)\right),$$

$$NLLH_{d,e} = \frac{1}{2} \sum_{k,t,j \neq i} \frac{(e_{ij}(t) - \mu_{ij}^{e,d}(t, \omega))^2}{(\sigma_{ij}^{e,d}(t, \omega))^2} + \sum_{k,t,j \neq i} \log\left(\sqrt{2\pi} \, \sigma_{ij}^{e,d}(t, \omega)\right),$$

$$NLLH_{w,n} = \frac{1}{2} \sum_{k,t} \frac{(n_i(t) - \mu_i^{n,w}(t, \omega))^2}{(\sigma_i^{n,w}(t, \omega))^2} + \sum_{k,t} \log\left(\sqrt{2\pi} \, \sigma_i^{n,w}(t, \omega)\right),$$

$$NLLH_{w,e} = \frac{1}{2} \sum_{k,t,j \neq 1} \frac{(e_{ij}(t) - \mu_{ij}^{e,w}(t, \omega))^2}{(\sigma_{ij}^{e,w}(t, \omega))^2} + \sum_{k,t,j \neq i} \log\left(\sqrt{2\pi} \, \sigma_{ij}^{e,w}(t, \omega)\right),$$

$$NLLH_{m,n} = \frac{1}{2} \sum_{k,t} \frac{(n_i(t) - \mu_i^{n,m}(t, \omega))^2}{(\sigma_i^{n,m}(t, \omega))^2} + \sum_{k,t} \log\left(\sqrt{2\pi} \, \sigma_i^{n,m}(t, \omega)\right),$$

and

-continued $$NLLH_{m,e} = \frac{1}{2}\sum\nolimits_{k,t,j\neq 1}\frac{\left(e_{ij}(t) - \mu_{ij}^{e,m}(t,\omega)\right)^2}{\left(\sigma_{ij}^{e,m}(t,\omega)\right)^2} + \sum\nolimits_{k,t,j\neq i}\log\left(\sqrt{2\pi}\,\sigma_{ij}^{e,m}(t,\omega)\right).$$

After determining the constraints, as discussed above, the global loss function may be determined for the concurrent daily, weekly, and monthly forecasts similarly to the daily forecasts, such that the optimal DNN parameters ω may be those parameters which minimize $\lambda_L$NLLH+$\lambda_E$E+$\lambda_I$I, and thus $\omega_{optimal}$=Argmin$_\omega$($\lambda_L$NLLH+$\lambda_E$E+$\lambda_I$I). Similarly to the daily forecast implementations, $\lambda_L$, $\lambda_E$, and $\lambda_I$ are the respective weighting factors for the one or more log-likelihood constraints, the one or more equality constraints and the one or more inequality constraints. However, as the log-likelihood, equality, and inequality constraints are more complicated, so too are E, and I in the global loss function, although both E and I are still based on error squared metrics related to the respective equality and inequality constraints.

Similarly to the daily forecast implementations, the equality constraints related to network flow may each be expressed in terms of an error metric, such that $\xi_i^{n,d}(t+1)=\mu_i^{n,d}(t+1,\omega)-\mu_i^{n,d}(t+1,\omega)-\Sigma_{j\neq i}\mu_{ij}^{e,d}(t,\omega)$, $\xi_i^{n,w}(t+1)=\mu_i^{n,w}(t+1,\omega)-\mu_i^{n,w}(t+1,\omega)-\Sigma_{j\neq i}\mu_{ij}^{e,w}(t,\omega)$, and $\xi_i^{n,m}(t+1)=\mu_i^{n,m}(t+1,\omega)-\mu_i^{n,m}(t+1,\omega)-\Sigma_{j\neq i}\mu_{ij}^{e,m}(t,\omega)$.

Further, the equality constraints relating to time scale consistency may each be written in the form of an error metric, such that $\theta_i^{w,n}(t)=\mu_i^{n,w}(t,\omega)-1,7\Sigma_{k=0}^{6}\mu_i^{n,d}(t-k,\omega)$, $\theta_i^{m,n}(t)=\mu_i^{n,m}(t,\omega)-\frac{1}{30}\Sigma_{k=0}^{29}\mu_i^{n,d}(t-k,\omega)$, $\theta_{ij}^{w,e}(t)=\mu_{ij}^{e,w}(t,\omega)-\frac{1}{7}\Sigma_{k=0}^{6}\mu_{ij}^{e,d}(t-k,\omega)$, and $\theta_{ij}^{m,n}(t)=\mu_{ij}^{n,m}(t,\omega)-\frac{1}{30}\Sigma_{k=0}^{29}\mu_{ij}^{e,d}(t-k,\omega)$.

A squared error penalty term E may be determined based on a squared error corresponding to the equality constraints. For example, E may be defined as $E=\Sigma_{i,t}((\xi_i^{n,d}(t+1))^2+(\xi_i^{n,w}(t+1))^2+(\xi_i^{n,m}(t+1))^2)+\Sigma_{i,t,j\neq i}((\theta_i^{w,n}(t))^2+(\theta_i^{m,n}(t))^2)+\Sigma_{i,t,j\neq i}((\theta_{ij}^{w,e}(t))^2+(\theta_{ij}^{m,e}(t))^2)$.

Similarly to the daily forecast implementations, the inequality constraints may each be expressed in the form of an error metric. For example, for the constraints that $\mu_i^{n,d}(t,\omega)\geq\varepsilon_d$, $\mu_i^{n,w}(t,\omega)\geq\varepsilon_w$, and $\mu_i^{n,m}(t,\omega)\geq\varepsilon_m$, these inequality constraints may be expressed as $\zeta_i^{n,d}(t)=(\mu_i^{n,d}(t,\omega)-\varepsilon_d)_+$, $\zeta_i^{n,w}(t)=(\mu_i^{n,w}(t,\omega)-\varepsilon_w)_+$, and $\zeta_i^{n,m}(t)=(\mu_i^{n,m}(t,\omega)-\varepsilon_m)_+$, where $(\cdot)_+$ operator represents non-negative minimum.

These error metrics based on the inequality constraints may be combined as error squared metrics to generate the error term I. For example, I may be defined as $I=\Sigma_{i,t}((\zeta_i^{n,d}(t))^2+(\zeta_i^{n,w}(t))^2(\zeta_i^{n,m}(t))^2)$.

Similarly to the daily forecast implementations, a derivative of the loss function may be back-propagated to the DNN to optimize the parameters for the DNN, and the DNN may be trained. Thus, in addition to respecting the inequality constraints and the network flow constraints, in these implementations the DNN may also be taught to respect the time scale consistency constraints at the weekly and the monthly level.

Note that while the implementations described above describe the equality constraints as relating only to network flow and to time scale consistency, in some other implementations the DNN may be optimized to respect other appropriate equality constraints. Further, while the implementations described above provide for time scale consistency constraints in terms of daily, weekly, and monthly forecasts, in some other implementations other appropriate timescales may be incorporated, for example quarterly time scale constraints, yearly time scale constraints, and so on.

Figure 5:
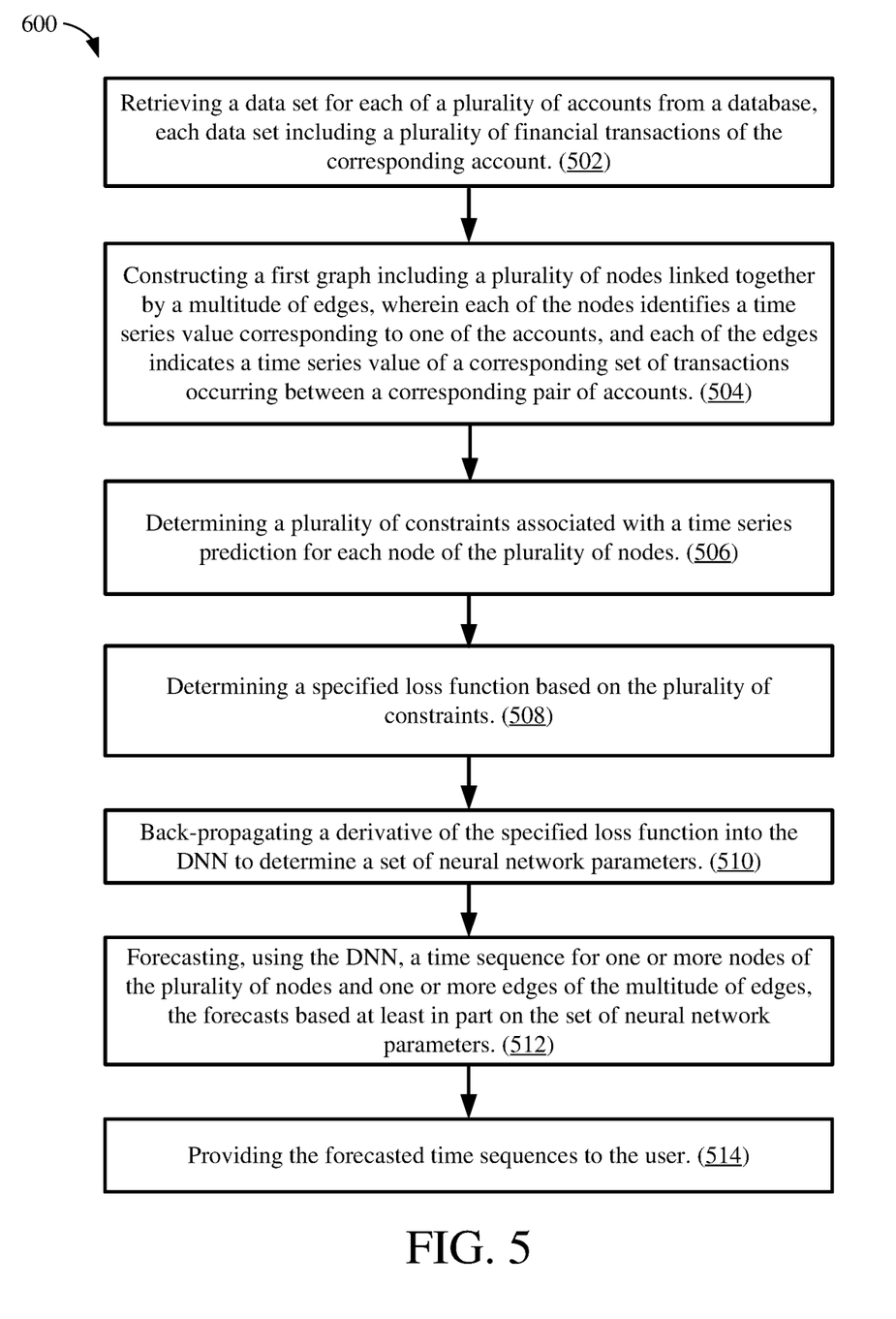
FIG. 5 shows an illustrative flow chart depicting an example operation for forecasting cashflows across one or more accounts of a user using a deep neural network (DNN), according to some implementations.

FIG. 5 shows an illustrative flow chart depicting an example operation 500 for forecasting cashflows across one or more accounts of a user using a deep neural network (DNN), according to some implementations. The example operation 500 may be performed by one or more processors of a computing device associated with the DNN. In some implementations, the example operation 500 may be performed using the account balance forecasting system 100 of FIG. 1. It is to be understood that the example operation 500 may be performed by any suitable systems, computers, or servers.

At block 502, the forecasting system 100 retrieves a data set for each of a plurality of accounts from a database. Each data set includes a plurality of financial transactions of the corresponding account. At block 504, the forecasting system 100 constructs a graph including a plurality of nodes linked together by a multitude of edges, where each of the nodes identifies a time series value corresponding to one of the accounts, and each of the edges indicates a time series value of a corresponding set of transactions occurring between a corresponding pair of accounts. At block 506, the forecasting system 100 determines a plurality of constraints associated with a time series prediction for each node of the plurality of nodes. At block 508, the forecasting system 100 determines a specified loss function based on the plurality of constraints. At block 510, the forecasting system 100 back-propagates a derivative of the specified loss function into the DNN to determine a set of neural network parameters. At block 512, the forecasting system 100 forecasts, using the DNN, a time sequence for each of one or more nodes of the plurality of nodes and for each of one or more edges of the multitude of edges based at least in part on the set of neural network parameters. At block 514, the forecasting system 100 provides the forecasted time sequences to the user.

In some implementations, the graph in block 504 is constructed such that each of the transactions indicated by a respective edge of the multitude of edges has a common transaction type, and each transaction type includes one of deposits, withdrawals, expenses, payments, or inter-account transfers.

In some implementations, the plurality of constraints determined in block 506 includes one or more equality constraints, one or more inequality constraints, and one or more log-likelihood constraints. Further, in some aspects, the one or more equality constraints are constrained by a forecasted value for each respective node at a time t+1 being equal to the forecasted value for the respective node at a time t summed with the edges linking the respective node to other nodes in the graph at the time t.

In some implementations, the set of parameters determined for the DNN in block 508 is configured to minimize a specified loss function which is based at least in part on forecasted error squared penalties for the respective one or more equality constraints or the one or more inequality constraints. Further, in some aspects, the specified loss function is based at least in part on respective weighting factors for each of the one or more equality constraints, the one or more inequality constraints, and the one or more log-likelihood constraints. In addition, or in the alternative, the set of parameters for the DNN is based on determining, for a parameter set ω, Argmin$_\omega$($\lambda_L$NLLH+$\lambda_E$E+$\lambda_I$I), where $\lambda_L$, $\lambda_E$, and $\lambda_I$ are the respective weighting factors for the one or more log-likelihood constraints, the one or more equality constraints and the one or more inequality constraints, NLLH is the sum of the negative log-likelihoods for the respective nodes and edges of the graph, E is an error squared term based on the one or more equality constraints, and I is an error-squared term based on the one or more inequality constraints.

In some aspects, E is a loss function component or error squared penalty term corresponding to the one or more equality constraints, for example, such that $E=\Sigma_{i,t}(\xi_i^n(t+1))^2$, where $\xi_i^n(t+1)=\mu_i^n(t+1, \omega)-\mu_i^n(t, \omega)-\Sigma_{j\neq i}\mu_{ij}^e(t, \omega)$. Further, I may be a loss function component or error squared penalty term corresponding to the inequality constraints. For example, when one or more nodes are constrained to have a minimum value $\varepsilon^n$, then I may be defined as $I=\Sigma_{i,t}(\zeta_i^n(t))^2$, where $\zeta_i^n(t)=(\mu_i^n(t, \omega)-\varepsilon^n)_+$. Further, in some aspects, $NLLH=NLLH_n \cdot NLLH_e$, where NLLH represents the negative log-likelihood, $NLLH_n$ represents the node-based negative log-likelihood component, and $NLLH_e$ represents the edge-based negative log-likelihood component. In some aspects, $$NLLH_n = \frac{1}{2}\sum_{k,t} \frac{(n_i(t) - \mu_i^n(t, \omega))^2}{(\sigma_i^n(t, \omega))^2} + \sum_{k,t} \log\left(\sqrt{2\pi}\,\sigma_i^n(t, \omega)\right),$$

and $$NLLH_e = \frac{1}{2}\sum_{k,j,t,j\neq i} \frac{(e_{ij}(t) - \mu_{ij}^e(t, \omega))^2}{(\sigma_{ij}^e(t, \omega))^2} + \sum_{k,j,t,j\neq i} \log\left(\sqrt{2\pi}\,\sigma_{ij}^e(t, \omega)\right).$$

In some implementations, the time sequence for each node of the plurality of nodes in block 512 is forecasted based on forecasting a daily value of the corresponding account. In some aspects, the time sequence for each node of the plurality of nodes is forecasted based on forecasting one or more of a weekly value or a monthly value of the corresponding account. In some aspects, the plurality of constraints are constrained by the forecasted weekly value of the corresponding account being equal to the average forecasted daily value of the corresponding account during the corresponding week, and the forecasted monthly value of the corresponding account being equal to the average forecasted daily value of the corresponding account during the corresponding month.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described above. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, or, any conventional processor, controller, microcontroller, or state machine. A processor also may be implemented as a combination of computing devices such as, for example, a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

What is claimed is:

1. A method of forecasting cashflows across one or more accounts of a user using a deep neural network (DNN), the method performed by one or more processors of a computing device associated with the DNN and comprising:
   retrieving data for each account of a plurality of accounts, the data indicating transactions of the corresponding account;
   constructing a graph including a plurality of nodes linked together by a multitude of edges, wherein each of the nodes indicates a time series value corresponding to one of the accounts, and each of the edges indicates a time series value of a corresponding set of transactions occurring between a corresponding pair of accounts;

determining a plurality of constraints associated with a time series prediction for each node of the plurality of nodes, wherein the plurality of constraints include one or more equality constraints, one or more inequality constraints, or one or more log-likelihood constraints;

determining a specified loss function based on the plurality of constraints and respective weighting factors for each of the one or more equality constraints, the one or more inequality constraints, and the one or more log-likelihood constraints;

back-propagating a derivative of the specified loss function into the DNN to determine a set of neural network parameters, wherein the determined set of neural network parameters comprises the set of neural network parameters, $\omega = \text{Argmin}_\omega(\lambda_L \text{NLLH} + \lambda_E E + \lambda_I I)$, wherein:

$\lambda_L$, $\lambda_E$, and $\lambda_I$ are the respective weighting factors for the one or more log-likelihood constraints, the one or more equality constraints, and the one or more inequality constraints;

NLLH is a loss term based on the one or more log-likelihood constraints, wherein NLLH comprises the sum of the negative log-likelihoods for the respective nodes and edges of the graph;

E is an error squared penalty term based on the one or more equality constraints; and I is an error-squared penalty term based on the one or more inequality constraints; and forecasting, using the DNN, a time sequence for each of one or more nodes of the plurality of nodes based at least in part on the set of neural network parameters.

2. The method of claim 1, wherein each of the transactions indicated by a respective edge of the multitude of edges has a common transaction type, and each transaction type comprises one of deposits, withdrawals, expenses, payments, or inter-account transfers.

3. The method of claim 1, further comprising forecasting, using the DNN, a time sequence for each of one or more edges of the multitude of edges based at least in part on the set of neural network parameters.

4. The method of claim 1, wherein the specified loss function is based at least in part on forecasted error squared metrics for the one or more equality constraints or the one or more inequality constraints.

5. The method of claim 1, wherein the one or more equality constraints are constrained by a forecasted value for each respective node at a time t+1 being equal to the forecasted value for the respective node at a time t summed with the edges linking the respective node to other nodes in the graph at the time t.

6. The method of claim 1, wherein $E = \Sigma_{i,t}(\xi_i^n(t+1))^2$, $\xi_i^n(t+1)$ is the error squared penalty term corresponding to the one or more equality constraints, $\xi_i^n(t+1) = \mu_i^n(t+1, \omega) - \mu_i^n(t, \omega) - \Sigma_{j \neq i} \mu_{ij}^e(t, \omega)$, $\mu_i^n(t+1, \omega)$ is the forecasted mean value at the i-th node at time t+1 based on the set of neural network parameters $\omega$, $\mu_i^n(t, \omega)$ is the forecasted mean value at the i-th node at time t based on the set of neural network parameters $\omega$, and $\mu_{ij}^e(t, \omega)$ is the forecasted mean edge between node i and node j at the time t based on the set of neural network parameters $\omega$.

7. The method of claim 1, wherein $I = \Sigma_{i,t}(\zeta_i^n(t))^2$, $\zeta_i^n(t)$ is the squatted error penalty term corresponding to the one or more inequality constraints, $\zeta_i^n(t) = (\mu_i^n(t, \omega) - e^n)_+$, $\mu_i^n(t, \omega)$ is the forecasted mean value at the i-th node at time t based on the set of neural network parameters $\omega$, and $e^n$ is a minimum value for a node, where $(\cdot)+$ operator represents non-negative minimum.

8. The method of claim 1, wherein $$NLLH = NLLH_n + NLLH_e,$$

and $$NLLH_n = \frac{1}{2}\sum_{i,t} \frac{(n_i(t) - \mu_i^n(t, \omega))^2}{(\sigma_i^n(t, \omega))^2} + \sum_{i,t} \log(\sqrt{2\pi}\, \sigma_i^n(t, \omega)),$$

and $$NLLH_e = \frac{1}{2}\sum_{i,j,t} \frac{(e_{ij}(t) - \mu_{ij}^e(t, \omega))^2}{(\sigma_{ij}^e(t, \omega))^2} + \sum_{i,j,t} \log(\sqrt{2\pi}\, \sigma_{ij}^e(t, \omega)).$$

9. The method of claim 1, wherein forecasting the time sequence for each node of the plurality of nodes further comprises forecasting a forecasted daily value of the corresponding account.

10. The method of claim 9, wherein:

forecasting the time sequence for each node of the plurality of nodes further comprises forecasting one or more of a weekly value or a monthly value of the corresponding account; and the plurality of constraints are constrained by the forecasted weekly value of the corresponding account being equal to the average forecasted daily value of the corresponding account during a corresponding week and the forecasted monthly value of the corresponding account being equal to the average forecasted daily value of the corresponding account during a corresponding month.

11. A system for forecasting cashflows across one or more accounts of a user using a deep neural network (DNN), the system comprising:

one or more processors; and a memory storing instructions that, when executed by the one or more processors, causes the system to perform operations including:

retrieving data for each account of a plurality of accounts, the data indicating transactions of the corresponding account;

constructing a graph including a plurality of nodes linked together by a multitude of edges, wherein each of the nodes indicates a time series value of a corresponding one of the accounts, and each of the edges indicates a time series value of a corresponding set of transactions occurring between a corresponding pair of accounts;

determining a plurality of constraints associated with a time series prediction for each node of the plurality of nodes, wherein the plurality of constraints include one or more equality constraints, one or more inequality constraints, or one or more log-likelihood constraints;

determining a specified loss function based on the plurality of constraints and respective weighting factors for each of the one or more equality constraints, the one or more inequality constraints, and the one or more log-likelihood constraints;

back-propagating a derivative of the loss function into the DNN to determine a set of neural network parameters, wherein the determined set of neural network parameters comprises the set of neural network parameters $\omega = \text{Argmin}_\omega(\lambda_L \text{NLLH} + \lambda_E E + \lambda_I I)$, wherein:

$\lambda_L$, $\lambda_E$, and $\lambda_I$ are the respective weighting factors for the one or more log-likelihood losses, penalties corresponding to the one or more equality constraints, and penalties corresponding to the one or more inequality constraints;

NLLH is a loss term based on the one or more log-likelihood constraints, wherein NLLH comprises the sum of the negative log-likelihoods for the respective nodes and edges of the graph;

E is an error squared penalty term based on the one or more equality constraints; and I is an error-squared penalty term based on the one or more inequality constraints; and forecasting, using the DNN, a time sequence for each of one or more nodes of the plurality of nodes based at least in part on the set of neural network parameters.

12. The system of claim 11, wherein execution of the instructions further causes the system to perform operations including forecasting, using the DNN, a time sequence for each of one or more edges of the multitude of edges based at least in part on the set of neural network parameters.

13. The system of claim 11, wherein the specified loss function is based at least in part on forecasted error squared metrics for the one or more equality constraints or the one or more inequality constraints.

14. The system of claim 11, wherein the one or more equality constraints are constrained by a forecasted value for each respective node at a time t+1 being equal to the forecasted value for the respective node at a time t summed with the forecasted edges linking the respective node to other nodes in the graph at the time t.

15. The system of claim 11, wherein $E=\Sigma_{i,t}(\xi_i^n(t+1))^2$, $\xi_i^n(t+1)$ is the error squared penalty term corresponding to the one or more equality constraints, $\xi_i^n(t+1)=\mu_i^n(t+1,\omega)-\mu_i^n(t,\omega)-\Sigma_{j\neq i}\mu_{ij}^e(t,\omega)$, $\mu_i^n(t+1,\omega)$ is the forecasted mean value at the i-th node at time t+1 based on the set of neural network parameters $\omega$, $\mu_i^n(t,\omega)$ is the forecasted mean value at the i-th node at time t based on the set of neural network parameters $\omega$, and $\mu_{ij}^e(t,\omega)$ is the forecasted mean edge between node i and node j at the time t based on the set of neural network parameters w.

16. A non-transitory computer-readable medium storing instructions that, when executed by one or more processors of a computing device, cause the computing device to forecast cashflows across one or more accounts of a user using a deep neural network (DNN) by performing operations comprising:

retrieving data for each account of a plurality of accounts, the data indicating transactions of the corresponding account;

constructing a graph including a plurality of nodes linked together by a multitude of edges, wherein each of the nodes indicates a time series value corresponding to one of the accounts, and each of the edges indicates a time series value of a corresponding set of transactions occurring between a corresponding pair of accounts;

determining a plurality of constraints associated with a time series prediction for each node of the plurality of nodes, wherein the plurality of constraints include one or more equality constraints, one or more inequality constraints, or one or more log-likelihood constraints;

determining a specified loss function based on the plurality of constraints and respective weighting factors for each of the one or more equality constraints, the one or more inequality constraints, and the one or more log-likelihood constraints;

back-propagating a derivative of the specified loss function into the DNN to determine a set of neural network parameters, wherein the determined set of neural network parameters comprises the set of neural network parameters $\omega=\text{Argmin}_\omega(\lambda_L\text{NLLH}+\lambda_E E+\lambda_I I)$, wherein:

$\lambda_L$, $\lambda_E$, and $\lambda_I$ are the respective weighting factors for the one or more log-likelihood losses, penalties corresponding to the one or more equality constraints, and penalties corresponding to the one or more inequality constraints;

NLLH is a loss term based on the one or more log-likelihood constraints, wherein NLLH comprises the sum of the negative log-likelihoods for the respective nodes and edges of the graph;

E is an error squared penalty term based on the one or more equality constraints; and I is an error-squared penalty term based on the one or more inequality constraints; and forecasting, using the DNN, a time sequence for each of one or more nodes of the plurality of nodes based at least in part on the set of neural network parameters.

* * * * *